United States Patent
Hardee et al.

(10) Patent No.: US 10,505,979 B2
(45) Date of Patent: Dec. 10, 2019

(54) DETECTION AND WARNING OF IMPOSTER WEB SITES

(71) Applicant: International Business Machines Corporation, Armonk, NY (US)

(72) Inventors: Christopher J. Hardee, Raleigh, NC (US); Steven R. Joroff, Minato-ku (JP); Pamela A. Nesbitt, Ridgefield, CT (US); Scott E. Schneider, Rolesville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 195 days.

(21) Appl. No.: 15/153,975

(22) Filed: May 13, 2016

(65) Prior Publication Data

US 2017/0331855 A1 Nov. 16, 2017

(51) Int. Cl.
*H04L 29/06* (2006.01)
*H04L 29/08* (2006.01)
*G06F 21/44* (2013.01)
*G06F 21/64* (2013.01)

(52) U.S. Cl.
CPC ........ *H04L 63/1483* (2013.01); *G06F 21/44* (2013.01); *G06F 21/64* (2013.01); *H04L 67/12* (2013.01); *G06F 2221/2111* (2013.01); *G06F 2221/2119* (2013.01); *H04L 63/1425* (2013.01)

(58) Field of Classification Search
CPC .............. H04L 63/1483; H04L 63/1425; G06F 2221/2119

USPC ........................................................... 726/22
See application file for complete search history.

(56) References Cited

U.S. PATENT DOCUMENTS

| | | | |
|---|---|---|---|
| 8,621,616 B2 | 12/2013 | Zhang et al. | |
| 8,776,220 B2 | 7/2014 | Chen et al. | |
| 2006/0168659 A1* | 7/2006 | Saitoh | G06F 21/6245 726/22 |
| 2008/0046738 A1 | 2/2008 | Galloway et al. | |
| 2014/0173726 A1* | 6/2014 | Varenhorst | H04L 63/1416 726/22 |
| 2014/0359760 A1* | 12/2014 | Gupta | H04L 63/1408 726/22 |
| 2016/0063541 A1 | 3/2016 | Geng et al. | |

FOREIGN PATENT DOCUMENTS

CN 104143008 A 11/2014

* cited by examiner

*Primary Examiner* — Teshome Hailu
(74) *Attorney, Agent, or Firm* — Cantor Colburn LLP; David Zwick

(57) ABSTRACT

Embodiments are directed to a computer-implemented method of identifying an imposter web page. The method includes extracting, using a processor system, visited web page data from a visited web page. The method further includes determining, using the processor system, that the visited web page is an imposter web page, based at least in part on determining, using the processor system, that website location data of the visited web page does not match website location data of at least one legitimate web page, as well as determining that text data associated with image data of the visited web page matches text data associated with image data of the at least one legitimate web page.

17 Claims, 5 Drawing Sheets

LOOKUP TABLE

LEGITIMATE STORED WEBPAGE/WEBSITE DATA

| LEGITIMATE WEBSITE/WEBPAGE — 140 | IMAGE DATA — 142 | TEXT DATA ASSOCIATED WITH IMAGE DATA — 144 | TEXT DATA NOT ASSOCIATED WITH IMAGE DATA — 146 | PAGE STRUCTURE/LAYOUT DATA — 148 | WEBSITE/WEBPAGE LOCATION DATA — 150 | OTHER DATA |
|---|---|---|---|---|---|---|
| www.mybank.com | DATA | DATA | DATA | DATA | DATA | DATA |
| www.myshopping.com | DATA | DATA | DATA | DATA | DATA | DATA |
| www.account.com | DATA | DATA | DATA | DATA | DATA | DATA |

DETECTION AND WARNING OF IMPOSTER WEB SITES

BACKGROUND

The present disclosure relates in general to evaluating the source of an actual or requested electronic communication through a network. More specifically, the present disclosure relates to methodologies, systems and computer program products for efficiently and effectively detecting and/or identifying a network communication that is from an imposter source.

The term "phishing" refers to the nefarious practice of using electronic communications to entice individuals to voluntarily disclose confidential information such as usernames, passwords and credit card details to a requester that, unknown to the individual, is masquerading as a trustworthy entity. In a typical scenario, phishing communications purport to be from legitimate sources such as popular social web sites, auction sites, banks, online payment processors or information technology (IT) administrators. Phishing communications can take a variety of forms. For example, phishing communications are often carried out by email spoofing or instant messaging in which email messages are created with a forged sender address and broadcast to a wide number of valid email addresses. The forged email may direct users to enter details at an imposter or fake website whose look and feel are almost identical to the legitimate web site. It would be beneficial to provide the capability of detecting and/or identifying a network communication that is from an imposter source.

SUMMARY

Embodiments are directed to a computer-implemented method of identifying an imposter web page. The method includes extracting, using a processor system, visited web page data from a visited web page. The method further includes determining, using the processor system, that the visited web page is an imposter web page, based at least in part on determining, using the processor system, that website location data of the visited web page does not match website location data of at least one legitimate web page, as well as determining that text data associated with image data of the visited web page matches text data associated with image data of the at least one legitimate web page.

Embodiments are further directed to a system for identifying an imposter web page. The system includes a memory and a processor system communicatively coupled to the memory. The processor system is configured to perform a method that includes extracting visited web page data from a visited web page. The method further includes determining that the visited web page is an imposter web page, based at least in part on determining that website location data of the visited web page does not match web site location data of at least one legitimate web page, as well as determining that text data associated with image data of the visited web page matches text data associated with image data of the at least one legitimate web page.

Embodiments are directed to a computer program product for identifying an imposter web page. The computer program product includes a computer readable storage medium having program instructions embodied therewith, wherein the computer readable storage medium is not a transitory signal per se. The program instructions are readable by a processor system to cause the processor system to perform a method that includes extracting visited web page data from a visited web page. The method further includes determining that the visited web page is an imposter web page, based at least in part on determining that website location data of the visited web page does not match web site location data of at least one legitimate web page, as well as determining that text data associated with image data of the visited web page matches text data associated with image data of the at least one legitimate web page.

Additional features and advantages are realized through the techniques described herein. Other embodiments and aspects are described in detail herein. For a better understanding, refer to the description and to the drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

FIG. 3 depicts an example lookup table in accordance with one or more embodiments;

Figure 1:
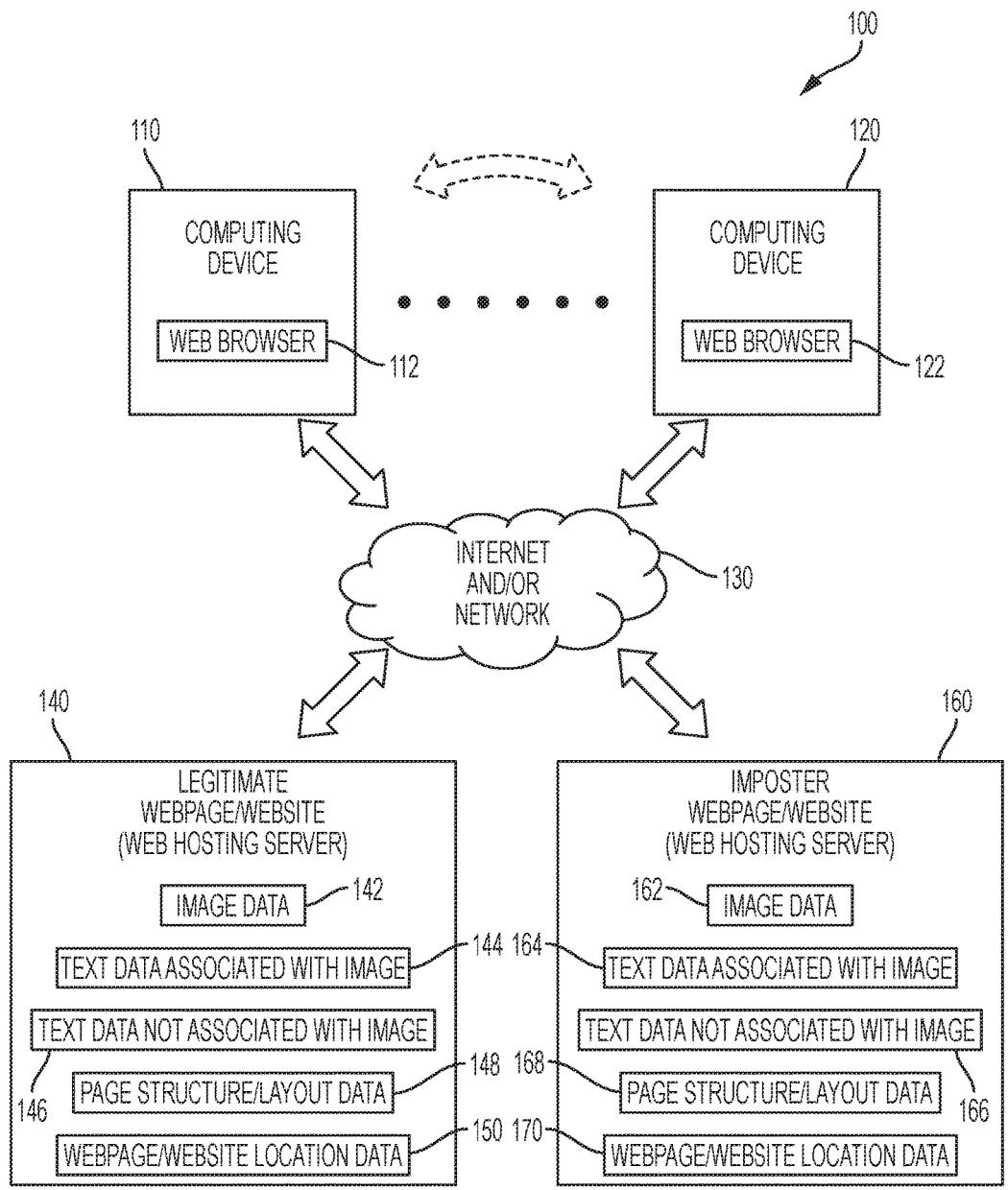
FIG. 1 depicts a block diagram illustrating an example of a network communications system in accordance with one or more embodiments.

In the accompanying figures and following detailed description of the disclosed embodiments, the various elements illustrated in the figures are provided with three digit reference numbers. The leftmost digit of each reference number corresponds to the figure in which its element is first illustrated.

DETAILED DESCRIPTION

It is understood in advance that, although this disclosure includes a detailed description of particular types of electronic communications and exchanges that occur through an internet-based communications network, the teachings recited herein are not limited to a particular type of electronic communication or network. Rather embodiments of the present disclosure are capable of being implemented in conjunction with any other type of electronic communication and/or communications network architecture, now known or later developed.

Various embodiments of the present disclosure are described herein with reference to the related drawings. Alternative embodiments may be devised without departing from the scope of this disclosure. It is noted that various connections and positional relationships (e.g., over, below, adjacent, etc.) are set forth between elements in the following description and in the drawings. These connections and/or positional relationships, unless specified otherwise, may be direct or indirect, and the present disclosure is not intended to be limiting in this respect. Accordingly, a coupling of entities may refer to either a direct or an indirect coupling, and a positional relationship between entities may be a direct or indirect positional relationship.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

As previously noted herein, the term "phishing" refers to the nefarious practice of using electronic communications to entice individuals to voluntarily disclose confidential information such as usernames, passwords and credit card details to a requester that, unknown to the individual, is masquerading as a trustworthy entity. In a typical scenario, phishing communications purport to be from legitimate sources such as popular social web sites, auction sites, banks, online payment processors or information technology (IT) administrators. Phishing communications can take a variety of forms. For example, phishing communications are often carried out by email spoofing or instant messaging in which email messages are created with a forged sender address and broadcast to a wide number of valid email addresses. The forged email may direct users to enter details at an imposter or fake website whose look and feel are almost identical to the legitimate web site.

The term phishing is used in the present disclosure to refer broadly to the multiple variations of phishing, including but not limited to threats such as "pharming," "vishing" and "spear phishing." Pharming is a hacker's attack aiming to redirect a website's traffic to another (bogus) website. Pharming can be conducted either by changing the hosts file on a victim's computer or by exploitation of a vulnerability in DNS server software. Vishing is the practice of leveraging voice over internet protocol (VoIP) technology to trick private personal and financial information from the public for the purpose of financial reward. Spear phishing describes any highly targeted phishing attack. Spear phishers send e-mail that appears genuine to all the employees or members within a certain company, government agency, organization, or group. Whereas traditional phishing scams are designed to steal information from individuals, spear phishing scams work to gain access to a company's entire computer system.

At their core, phishing and its variations attempt to socially engineer a message recipient into providing personal or confidential information that can later be used by the phisher to conduct fraudulent activities. The methods used by the phisher to coax the information from his/her victims are as many as they are varied, but one of the most commonly encountered vectors is through an e-mail that appears to be from the victim's financial institution. The e-mail purports a problem with the victim's account, which requires the victim to follow an embedded URL that takes the victim to a fraudulent Web site. Once at the site, the victim is prompted to "login" thereby enabling the phisher to steal a copy of the victim's authentication credentials.

The present disclosure and exemplary embodiments described herein provide methodologies, systems and computer program products for evaluating the source of an actual or requested electronic communication through a network. More specifically, the present disclosure and exemplary embodiments described herein provide methodologies, systems and computer program products for efficiently and effectively detecting and/or identifying a network communication that is from an imposter source. In disclosed embodiments, the network includes the internet. Additionally, as used herein, the terms "web page" and "website" are substantially interchangeable. For example, it is understood that a web page is either itself a website, or that one of several pages of a website. It is further understood that a website can include one or more web pages.

Turning now to an overview of the present disclosure, a methodology according to one or more embodiments extracts and stores local copies of legitimate web page data from the legitimate web sites that are visited by the user computing device. The legitimate web page data may be stored at the user computing device, or may be stored remotely and searched/accessed by the user computing device when needed. The legitimate stored web page data may also be shared among a user's multiple authorized and connected computing devices. The legitimacy of a web site may be determined in a variety ways, including, for example, the number of times the user computing device accesses the particular website.

The legitimate stored web page data may include image data, text data directly associated with (e.g., contained within) the image data, text data not directly associated with (e.g., not contained within) the image data, page structure/layout data, web site location data and the like. More specifically, in accordance with one or more embodiments, the text data directly associated with image data is developed by analyzing the image data and converting text image data of the image data into searchable text data using techniques such as optical character recognition (OCR). The legitimate stored web page data may be stored in a lookup table in memory to facilitate searching.

When the user computing device visits a web page, the disclosed methodology, prior to allowing the user to submit information at the web page, compares the website location data (e.g., a URL) of the visited web page data with the legitimate website location data of the legitimate websites stored in memory. If this comparison results in a match, the user computing device determines that the visited site is a website that the user computing device has successfully visited multiple times in the past, and concludes that the visited website is most likely a legitimate website.

However, if the above-described comparisons do not result in a match, the user computing device does not have enough information to reliably determine whether the visited website is a legitimate website or an imposter website. According to one or more embodiments, an additional level of analysis and user notification are provided by developing web page data for the visited website and making selected comparisons between the visited web page data and the stored legitimate web page data. According to one or more embodiments, the visited web page data, similar to the stored legitimate web page data, may include image data, text data directly associated with (e.g., contained within) the image data, text data not directly associated with (e.g., not contained within) the image data, page structure/layout data, website location data and the like. More specifically, in accordance with one or more embodiments, the text data directly associated with image data is developed by analyzing the image data and converting text image data of the image data into searchable text data using techniques such as optical character recognition (OCR).

The selected comparisons performed according to one or more embodiments include a comparison between the visited web page's text data that is directly associated with (e.g., contained within) the visited web page's image data, and the legitimate stored web page's text data that is directly associated with (e.g., contained within) the legitimate web page's image data. The selected comparisons performed according to one or more embodiments may further include a comparison between the visited web page's text data that is not directly associated with (e.g., not contained within) the visited web page's image data, and the legitimate stored web page's text data that is not directly associated with (e.g., not contained within) the legitimate web page's image data. The selected comparisons performed according to one or more embodiments may further include a comparison between the visited web page's page structure/layout data, and the legitimate stored web page's page structure/layout data.

According to one or more embodiments, if any one of the above-described comparisons for a given visited website results in a match, or if any combination of the above-described comparisons for a given visited website results in a match, and if it was determined that the website location data (e.g., URL) of the given visited website is not stored among the stored legitimate web page data of the user computing device, it is determined that the visited website is an imposter website that is attempting to mimic a legitimate website. In one more embodiments, the above-described determination of a match can be made by developing a confidence level for the comparison, and counting the comparison result as a match if the confidence level of the comparison result exceeds a predetermined threshold.

If it is determined according to one or more of the disclosed embodiments that the visited website is an imposter website that is attempting to mimic a legitimate website, the user computing device may generate a notification and present the notification to the user. The notification may take a variety of forms, including for example disabling the user computing device's access to the imposter website, displaying a warning, reporting the imposter website determination to a central location with information about the imposter website/webpage or providing the option to go to the legitimate website/webpage that the imposer website/webpage is attempting to mimic.

Figure 4:
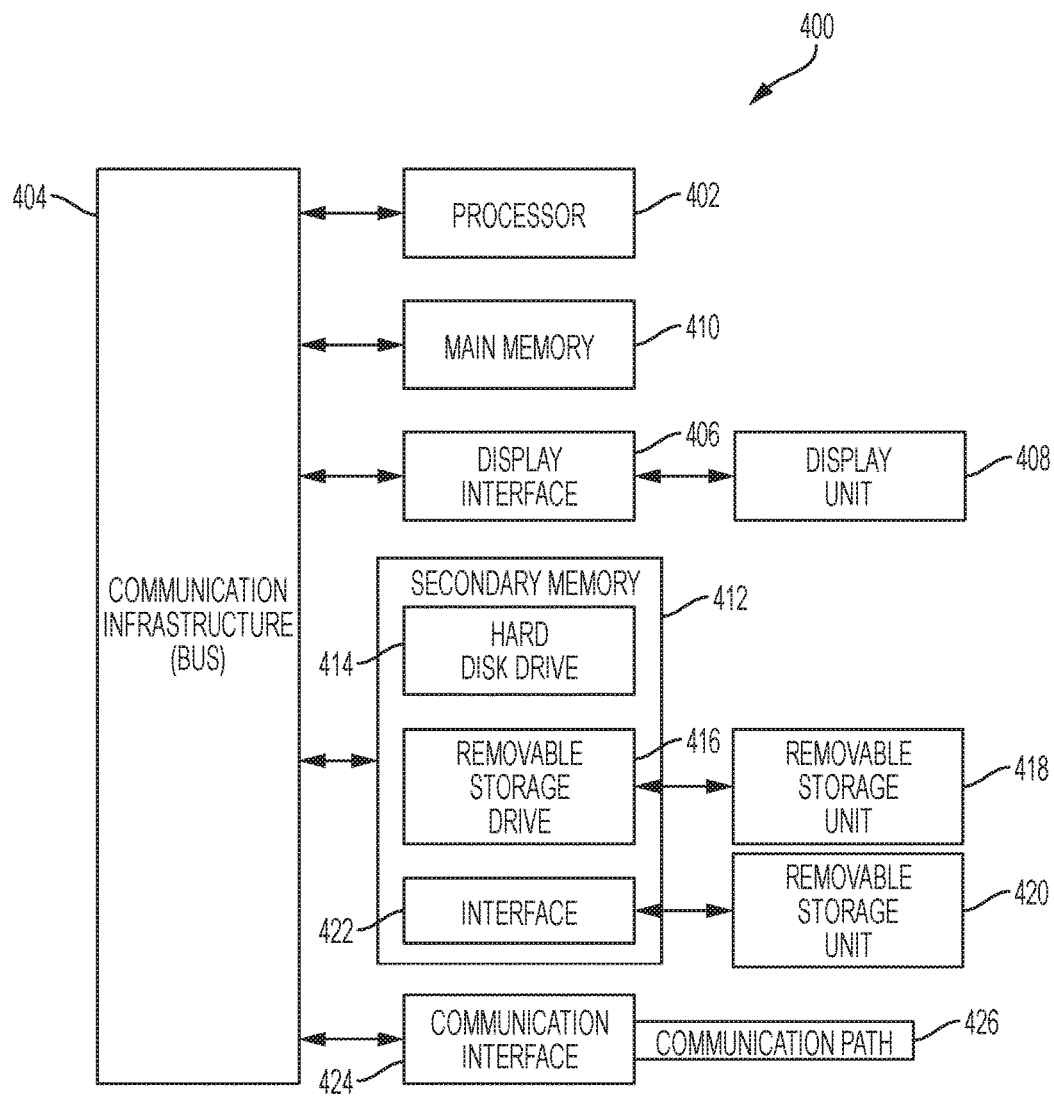
FIG. 4 depicts a block diagram of a computer system in accordance with one or more embodiments.

Turning now to a more detailed description of the present disclosure, FIG. 1 depicts a block diagram illustrating a network communications system 100 in accordance with one or more embodiments. System 100 includes multiple user computing devices, two examples of which are shown in FIG. 1 as computing device 110 and computing device 120. In one or more embodiments, computing device 110 and computing device 120 include a wide variety of computing devices such as a smart phone, a smartwatch, a laptop, a desktop and the like. Additional details of an exemplary configuration for computing devices 110, 120 are depicted at computer system 400, which is shown in FIG. 4 and described in greater detail later in this disclosure.

In one or more embodiments, computing devices 110, 120 may be stand-alone and unrelated. In one or more embodiments, computing devices 110, 120 may be related computing devices of the same user, or may be related computing devices of different users that are part of a group such as the different users in a family wireless data plan, or the different users in a crowdsourcing group. Although two computing devices 110, 120 are shown, it is understood that more than two computing devices may be provided.

Computing devices 110, 120 each includes web browsers 112, 122, respectively. Web browsers 112, 122 provide the capability of communicating through and with internet/network 130. It should be understood that descriptions herein of the operations of one of the computing devices 110, 120 apply equally to both of the computing devices 110, 120.

System 100 further includes various websites (i.e., web hosting servers) that can be accessed by computing devices 110, 120 through internet/network 130. In effect, webpages and/or websites are actually an electronic text file stored on the hard drive of a computer that is constantly hooked up to the Internet (e.g., internet/network 130). Such a computer is often referred to as a web hosting server. When a computing device calls up or "visits" a webpage/website, usually by clicking on a link from another web page, the computing device uses the internet to contact this web hosting server and retrieves or downloads this text file. The browser then reads this text file through the aid of a program called a "web browser" and displays it on the screen according to the formatting and specifications laid out in it. These electronic text files are written in a special language called hypertext markup language (HTML).

For ease of illustration and explanation, two example websites are shown in FIG. 1, namely a legitimate website 140 and an imposter website 160. Although two websites 140, 160 are shown, it is understood that more than two websites may be included. Legitimate website 140, as well as imposter website 160, are each, in effect, a web hosting server that houses pages of linked data that form the content of the given web site. Included among these pages are web page data that may be extracted and stored by computing devices 110, 120. The extracted web page data may be stored at the user computing device 110, 120, or may be stored remotely and searched/accessed by the user computing device 110, 120 when needed. The stored web page data may also be shared among computing devices 110, 120 for embodiments wherein computing devices 110, 120 are related. The web page data may that may be extracted and stored for legitimate web site 140 are shown in FIG. 1 as image data 142, text data directly associated with (e.g., contained within) the image data 144, text data not directly associated with (e.g., not contained within) the image data 146, page structure/layout data 148 and website location data (e.g., a URL) 150. The web page data may that may be extracted from imposter website 160 are shown in FIG. 1 as image data 162, text data directly associated with (e.g., contained within) the image data 164, text data not directly associated with (e.g., not contained within) the image data 166, page structure/layout data 168 and web site location data (e.g., a URL) 170.

Website location data 150, 170 may take a variety of forms, including for example an address of a web hosting server on the internet or other network. In a communications network, an address is an identifier assigned to each device on the network. As applied to the internet, a device's address is known generally as its "internet protocol address" (IP address), which is a numerical representation of the device's virtual location on the Internet. If the device hosts a website, the host device's IP address is used to locate the host device and provide access to content from the website. For example, the web domain www.google.com actually represents a numerical IP address, which could be, for example, 73.14.213.99. When user computing device 110 types in a domain name at is web browser 112, a downstream DNS system (not shown) matches or routes the entered domain name to an IP address, then uses the numerical IP address to locate and provide access to the host server device associated with that address.

Figure 2:
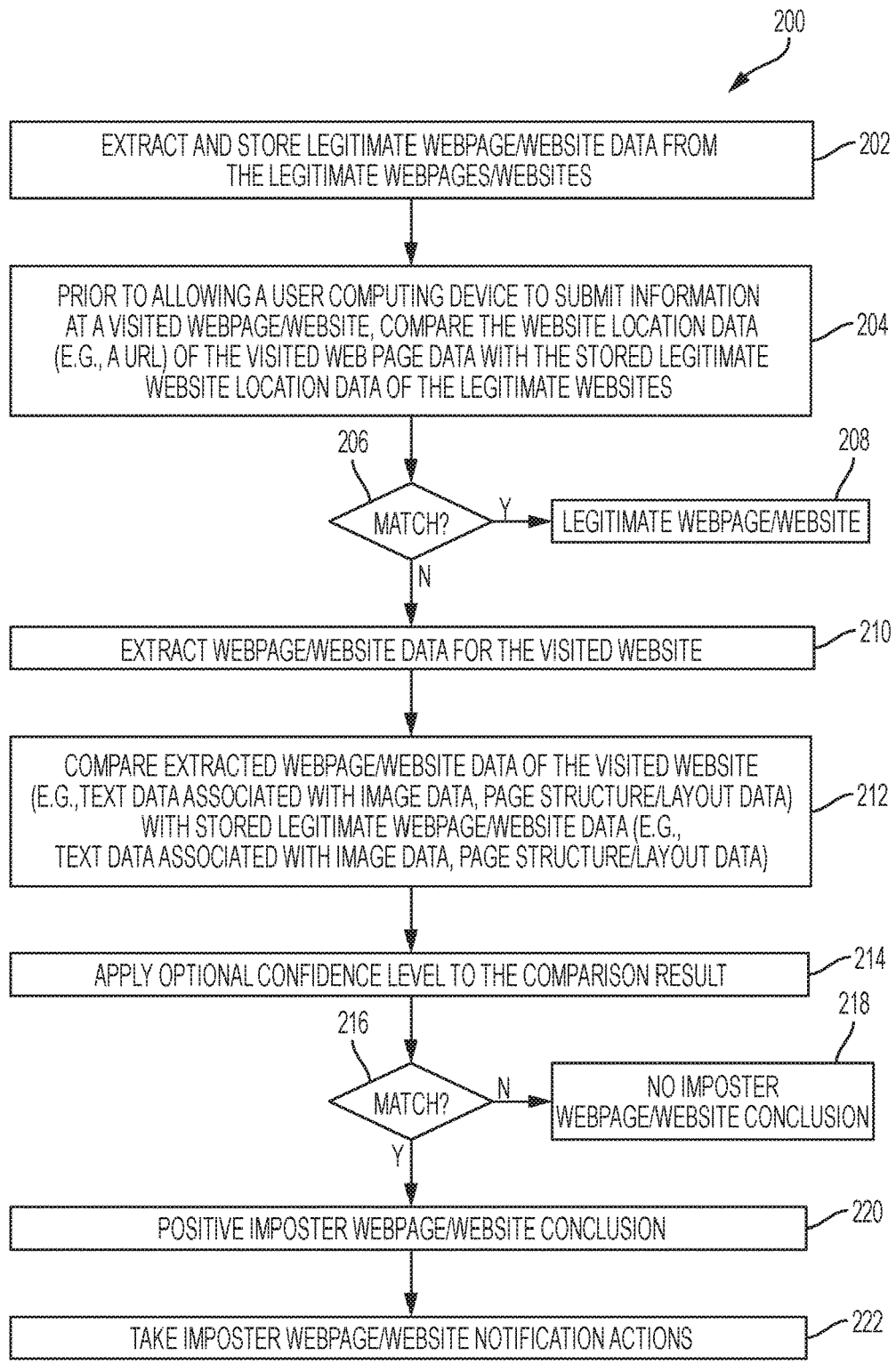
FIG. 2 depicts a flow diagram illustrating a methodology in accordance with one or more embodiments.

FIG. 2 depicts a flow diagram illustrating a methodology 200 that may be performed by system 100 in accordance with one or more embodiments. FIG. 3 depicts an example lookup table 300 that may be utilized in connection with system 100 performing methodology 200 in accordance with one or more embodiments. Lookup table 300 accumulates web page data extracted and stored from legitimate websites such as legitimate website 140 shown in FIG. 1. The format and content of lookup table 300 is an example, and many formats and options are available without departing from the scope of the present disclosure. Lookup table 300 may be stored in and accessed through computing devices 110, 120. A description of the operation of system 100 will now be provided with reference to system 100, methodology 200 and lookup table 300.

Computing device 110 extracts and stores local copies of legitimate web page data from the legitimate web sites (e.g., legitimate website 140) that are visited by computing device 110 (block 202). The legitimate web page data may be stored at computing device 110, or may be stored at a remote location (now shown) and searched/accessed by computing device 110 when needed. The legitimate stored web page data may also be shared among a user's multiple authorized and connected computing devices (e.g., computing device 120). The legitimacy of a website may be determined in a variety ways, including, for example, the number of times user computing device 110 accesses the particular website.

The legitimate stored web page data may include image data 142, text data directly associated with (e.g., contained within) the image data 144, text data not directly associated with (e.g., not contained within) the image data 146, page structure/layout data 148, website location data 150 and the like. More specifically, in accordance with one or more embodiments, the text data 144 directly associated with image data is developed by analyzing the image data 142 and converting text image data of the image data 142 into searchable text data using techniques such as optical character recognition (OCR). The legitimate stored web page data may be stored in lookup table 300, which is part of computing device 100, to facilitate searching.

When computing device 110 visits a web page, such as a web page of imposter website 160, prior to allowing the user to submit information at the visited web page, computing device 110 compares the visited website location data 150 (e.g., a URL) of the visited web page data with the legitimate website location data of the legitimate websites stored in lookup table 300 (block 204). If this comparison results in a match, computing device 110 determines that the visited site is a website that the user computing device has successfully visited multiple times in the past, and concludes that the visited website is most likely a legitimate website (blocks 206, 208).

However, if the above-described comparisons do not result in a match, computing device 110 does not have enough information to reliably determine whether the visited website is a legitimate website or an imposter website. According to one or more embodiments, an additional level of analysis and user notification are provided by extracting web page data from the visited website and making selected comparisons between the visited web page data and the stored legitimate web page data (blocks 210, 212). According to one or more embodiments, using imposter website 160 as an example, the visited web page data, similar to the stored legitimate web page data, may include image data 162, text data directly associated with (e.g., contained within) the image data 164, text data not directly associated with (e.g., not contained within) the image data 166, page structure/layout data 160, website location data 170 and the like. More specifically, in accordance with one or more embodiments, text data 164 directly associated with image data is extracted by analyzing image data 162 and converting text image data (e.g., 164) of image data into searchable text data using techniques such as optical character recognition (OCR).

Using legitimate website 140 and imposter website 160 as examples, the selected comparisons performed according to one or more embodiments include a comparison between the visited web page's text data 164 that is directly associated with (e.g., contained within) the visited web page's image data, and the legitimate stored web page's text data 144 that is directly associated with (e.g., contained within) the legitimate web page's image data. The selected comparisons performed according to one or more embodiments may further include a comparison between the visited web page's text data 166 that is not directly associated with (e.g., not contained within) the visited web page's image data, and the legitimate stored web page's text data 146 that is not directly associated with (e.g., not contained within) the legitimate web page's image data. The selected comparisons performed according to one or more embodiments may further include a comparison between the visited web page's page structure/layout data 168, and the legitimate stored web page's page structure/layout data 148.

According to one or more embodiments, if any one of the above-described comparisons for a given visited website does not result in a match, or if any combination of the above-described comparisons for a given visited website does not result in a match, and if it was determined that the website location data (e.g., a URL) of the given visited website is not stored among the stored legitimate web page data of the user computing device, no conclusion is reached about whether the visited website is an imposter website that is attempting to mimic a legitimate website (blocks 216, 218). According to one or more embodiments, if any one of the above-described comparisons for a given visited website results in a match, or if any combination of the above-described comparisons for a given visited website results in a match, and if it was determined that the website location data (e.g., a URL) of the given visited website is not stored among the stored legitimate web page data of the user computing device, it is determined that the visited web site is an imposter website that is attempting to mimic a legitimate web site (blocks 216, 218).

In one more embodiments, the above-described determination of a match can be made by generating, using standard statistics techniques, a confidence level for the comparison, and counting the comparison result as a match if the confidence level of the comparison result exceeds a predetermined threshold (block 214). More specifically, the extent to which a comparison of two things match can be generated at confidence levels (CLs). When it is determined that the value of a CL is below a predetermined threshold (TH) (i.e., CL<TH), it can be concluded that the comparison did not result in a match. If CL>TH, it can be concluded that the comparison did result in a match. Many different predetermined TH levels may be provided depending on the desired level of accuracy.

If it is determined according to one or more of the disclosed embodiments that the visited website is an imposter website that is attempting to mimic a legitimate website, the user computing device may generate a notification and present the notification to the user (blocks 220, 222). The notification may take a variety of forms, including for example disabling the user computing device's access to the imposter website, displaying a warning, reporting the imposter website determination to a central location with information about the imposter website/webpage or providing the option to go to the legitimate website/webpage that the imposer website/webpage is attempting to mimic.

FIG. 4 depicts a high level block diagram computer system 400, which may be used to implement one or more embodiments of the present disclosure. More specifically, computer system 400 may be used to implement hardware components of computing devices 110, 120 shown in FIG. 1 and lookup table 300 shown in FIG. 3. Although one exemplary computer system 400 is shown, computer system 400 includes a communication path 426, which connects computer system 400 to additional systems (not depicted) and may include one or more wide area networks (WANs) and/or local area networks (LANs) such as the Internet, intranet(s), and/or wireless communication network(s). Computer system 400 and additional system are in communication via communication path 426, e.g., to communicate data between them.

Computer system 400 includes one or more processors, such as processor 402. Processor 402 is connected to a communication infrastructure 404 (e.g., a communications bus, cross-over bar, or network). Computer system 400 can include a display interface 406 that forwards graphics, textual content, and other data from communication infrastructure 404 (or from a frame buffer not shown) for display on a display unit 408. Computer system 400 also includes a main memory 410, preferably random access memory (RAM), and may also include a secondary memory 412. Secondary memory 412 may include, for example, a hard disk drive 414 and/or a removable storage drive 416, representing, for example, a floppy disk drive, a magnetic tape drive, or an optical disk drive. Removable storage drive 416 reads from and/or writes to a removable storage unit 418 in a manner well known to those having ordinary skill in the art. Removable storage unit 418 represents, for example, a floppy disk, a compact disc, a magnetic tape, or an optical disk, etc. which is read by and written to by removable storage drive 416. As will be appreciated, removable storage unit 418 includes a computer readable medium having stored therein computer software and/or data.

In alternative embodiments, secondary memory 412 may include other similar means for allowing computer programs or other instructions to be loaded into the computer system. Such means may include, for example, a removable storage unit 420 and an interface 422. Examples of such means may include a program package and package interface (such as that found in video game devices), a removable memory chip (such as an EPROM, or PROM) and associated socket, and other removable storage units 420 and interfaces 422 which allow software and data to be transferred from the removable storage unit 420 to computer system 400.

Computer system 400 may also include a communications interface 424. Communications interface 424 allows software and data to be transferred between the computer system and external devices. Examples of communications interface 424 may include a modem, a network interface (such as an Ethernet card), a communications port, or a PCM-CIA slot and card, etcetera. Software and data transferred via communications interface 424 are in the form of signals which may be, for example, electronic, electromagnetic, optical, or other signals capable of being received by communications interface 424. These signals are provided to communications interface 424 via a communication path (i.e., channel) 426. Communication path 426 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 410 and secondary memory 412, removable storage drive 416, and a hard disk installed in hard disk drive 414. Computer programs (also called computer control logic) are stored in main memory 410 and/or secondary memory 412. Computer programs may also be received via communications interface 424. Such computer programs, when run, enable the computer system to perform the features of the present disclosure as discussed herein. In particular, the computer programs, when run, enable processor 402 to perform the features of the computer system. Accordingly, such computer programs represent controllers of the computer system.

Thus it can be seen from the forgoing detailed description that one or more embodiments of the present disclosure provide technical benefits and effects, including specifically performing OCR on images of web pages to determine if the text in the image is intended to mimic the content of another web page. Without benefit of the disclosed teachings, font and other changes to text in the images could deceive known anti-phishing methodologies that do not checking this content. In addition, explicitly checking the fields in a form of a web page (e.g., page structure/layout data 148, 168) catches more actual phishing attempts, because the form fields of an imposter web page must exist in order to harvest confidential information from the user.

Figure 5:
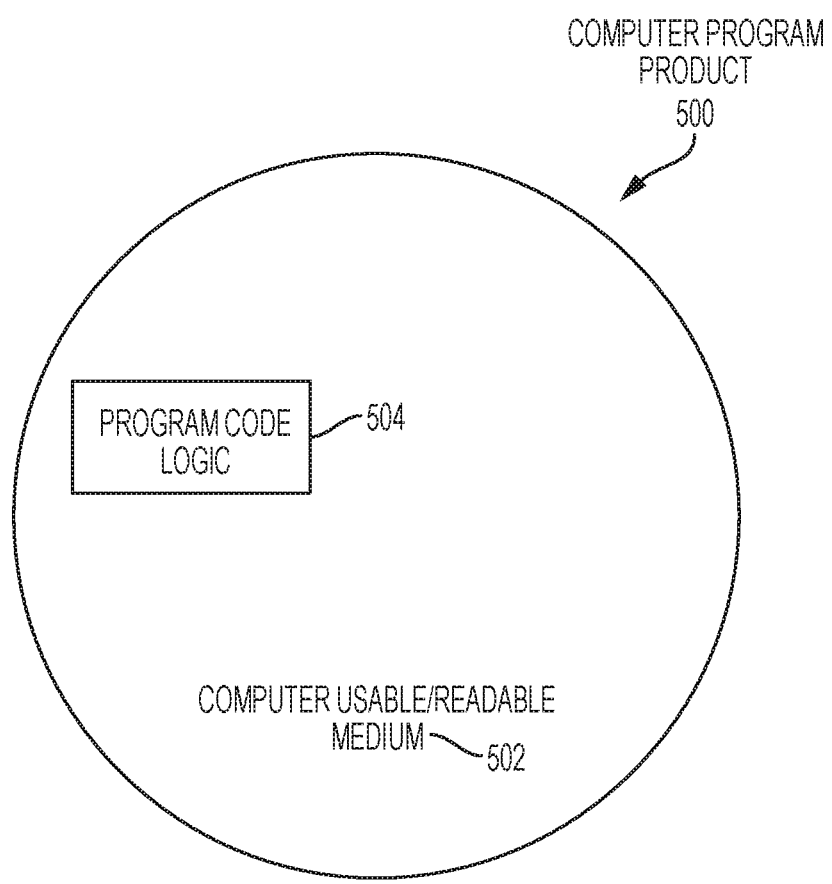
FIG. 5 depicts a computer program product in accordance with one or more embodiments.

Referring now to FIG. 5, a computer program product 500 in accordance with an embodiment that includes a computer readable storage medium 502 and program instructions 504 is generally shown.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method of identifying an imposter web page, the computer-implemented method comprising:
  accessing, using a user computing device, a visited web page of a visited web site;

prior to allowing a user to use the user computing device to submit information at the visited web page, using a processor system of the user computing device to perform the following operations:

determining, using a processor system of the user computing device, whether website location data of the visited web page matches website location data of at least one legitimate web page;

determining, using the processor system, that the visited web page is a legitimate web page based at least in part on determining that the website location data of the visited web page matches the website location data of at least one legitimate web page;

based at least in part on determining, using the processor system, that the website location data of the visited web page does not match the website location data of at least one legitimate web page, making a preliminary determination that the visited web page could be an imposter web page;

based at least in part on making the preliminary determination that the visited web page could be an imposter web page, extracting, using the processor system, visited web page data from the visited web page;

based at least in part on making the preliminary determination that the visited web page could be an imposter web page, making a final determination, using the processor system, that the visited web page is an imposter web page, based at least in part on:

generating extracted text data by extracting, using the processor system, from image data of the visited web page text data associated with and contained within the image data of the visited web page;

determining that the extracted text data matches text data associated with and contained within image data of the at least one legitimate web page; and determining that page structure data of the visited web page matches page structure data of the at least one legitimate web page;

wherein the page structure data of the visited web page comprises one or more fields in a form on the visited web page; and based on determining that the visited web page is an imposter web page, generating, using the processor system, a notification that the visited web page is an imposter web page.

2. The computer-implemented method of claim 1, wherein determining, using the processor system, that website location data of the visited web page does not match website location data of at least one legitimate web page comprises comparing website location data of the visited web page to website location data of at the least one legitimate web page.

3. The computer-implemented method of claim 1, wherein determining that the extracted text data matches text data associated with and contained within image data of the at least one legitimate web page comprises comparing the extracted text data with the text data associated with and contained within image data of the at least one legitimate web page.

4. The computer implemented method of claim 3, wherein determining that the extracted text data matches text data associated with and contained within image data of the at least one legitimate web page comprises:

determining a confidence level of a result of comparing the extracted text data with the text data associated with and contained within image data of the at least one legitimate web page; and determining that the confidence level exceeds a predetermined threshold.

5. The computer implemented method of claim 1, wherein determining that the page structure data of the visited web page matches the page structure data of the at least one legitimate web page comprises comparing the page structure data of the visited web page with the page structure data of the at least one legitimate web page.

6. The computer implemented method of claim 5, wherein determining that the page structure data of the visited web page matches the page structure data of the at least one legitimate web page comprises:

determining a confidence level of a result of comparing the page structure data of the visited web page with the page structure data of the at least one legitimate web page; and determining that the confidence level exceeds a predetermined threshold.

7. A system for identifying an imposter web page, the system comprising:

a user computing device having a memory and a processor system;

wherein the processor system is communicatively coupled to the memory and configured to perform a method comprising:

prior to allowing a user to use the user computing device to submit information at a visited web page, using the processor to perform the following operations:

extracting visited web page data from a visited web page;

determining that the visited web page is an imposter web page, based at least in part on:

determining that website location data of the visited web page does not match website location data of at least one legitimate web page;

wherein image data of the visited web page comprises text data associated with and contained within the image data of the visited web page;

generating extracted text data by extracting from the image data of the visited web page the text data associated with and contained within the image data of the visited web page; and determining that the extracted text data matches text data associated with and contained within image data of the at least one legitimate web page;

determining that page structure data of the visited web page matches page structure data of the at least one legitimate web page;

wherein the page structure data of the visited web page comprises one or more fields in a form on the visited web page; and based on determining that the visited web page is an imposter web page, generating, using the processor system, a notification that the visited web page is an imposter web page.

8. The system of claim 7, wherein determining that website location data of the visited web page does not match website location data of at least one legitimate web page comprises comparing website location data of the visited web page to website location data of at the least one legitimate web page.

9. The system of claim 7, wherein determining that the extracted text data matches text data associated with and contained within image data of the at least one legitimate web page comprises comparing the extracted text with the text data associated with and contained within image data of the at least one legitimate web page.

10. The system of claim 9, wherein determining that the extracted text data matches text data associated with and contained within image data of the at least one legitimate web page comprises:
   determining a confidence level of a result of comparing the extracted text data with the text data associated with and contained within image data of the at least one legitimate web page; and
   determining that the confidence level exceeds a predetermined threshold.

11. The system of claim 7, wherein determining that the page structure data of the visited web page matches the page structure data of the at least one legitimate web page comprises comparing the page structure data of the visited web page with the page structure data of the at least one legitimate web page.

12. The system of claim 11, wherein determining that the page structure data of the visited web page matches the page structure data of the at least one legitimate web page comprises:
   determining a confidence level of a result of comparing the page structure data of the visited web page with the page structure data of the at least one legitimate web page; and
   determining that the confidence level exceeds a predetermined threshold.

13. A computer program product for identifying an imposter web page, the computer program product comprising:
   a non-transitory computer readable storage medium having program instructions embodied therewith, the program instructions readable by a processor system of a user computing device to cause the processor system to perform a method comprising:
      prior to allowing a user to user to use the computing device to submit information at a visited web page, using the processor system to perform the following operations:
         extracting visited web page data from a visited web page;
         determining that the visited web page is an imposter web page, based at least in part on:
            determining that website location data of the visited web page does not match website location data of at least one legitimate web page;
            wherein image data of the visited web page comprises text data associated with and contained within the image data of the visited web page;
            generating extracted text data by extracting from the image data of the visited web page the text data associated with and contained within the image data of the visited web page; and
            determining that the extracted text data matches text data associated with and contained within image data of the at least one legitimate web page;
            determining that page structure data of the visited web page matches page structure data of the at least one legitimate web page;
            wherein the page structure data of the visited web page comprises one or more fields in a form on the visited web page; and
         based on determining that the visited web page is an imposter web page, generating, using the processor system, a notification that the visited web page is an imposter web page.

14. The computer program product of claim 13, wherein determining that website location data of the visited web page does not match website location data of at least one legitimate web page comprises comparing website location data of the visited web page to website location data of at the least one legitimate web page.

15. The computer program product of claim 13, wherein determining that the extracted text data matches text data associated with and contained within image data of the at least one legitimate web page comprises comparing the extracted text data with the text data associated with and contained within image data of the at least one legitimate web page.

16. The computer program product of claim 15, wherein determining that extracted text data matches text data associated with and contained within image data of the at least one legitimate web page comprises:
   determining a confidence level of a result of comparing the extracted text data with the text data associated with and contained within image data of the at least one legitimate web page; and
   determining that the confidence level exceeds a predetermined threshold.

17. The computer program product of claim 13, wherein determining that the page structure data of the visited web page matches the page structure data of the at least one legitimate web page comprises:
   comparing the page structure data of the visited web page with the page structure data of the at least one legitimate web page;
   determining a confidence level of a result of comparing the page structure data of the visited web page with the page structure data of the at least one legitimate web page; and
   determining that the confidence level exceeds a predetermined threshold.

* * * * *